United States Patent [19]

Breuer

[11] 3,856,785

[45] Dec. 24, 1974

[54] CEPHALOSPORIN ESTERS
[75] Inventor: Hermann Breuer, Regensburg, Germany
[73] Assignee: E. R. Squibb & Sons, Inc., Princeton, N.J.
[22] Filed: July 24, 1972
[21] Appl. No.: 274,362

[52] U.S. Cl............................ 260/243 C, 424/246
[51] Int. Cl............................................ C07d 99/24
[58] Field of Search................................ 260/243 C

[56] References Cited
UNITED STATES PATENTS
3,488,729   1/1970   Chauvette et al................ 260/243 C
3,655,658   4/1972   Godtfredsen et al............. 260/243 C Primary Examiner—Nicholas S. Rizzo
Attorney, Agent, or Firm—Lawrence S. Levinson; Merle J. Smith

[57] ABSTRACT

Cephalosporin esters and their methods of preparation are disclosed. In addition, compositions containing said compounds and methods for treating microbial infections utilizing said compositions are given.

6 Claims, No Drawings

CEPHALOSPORIN ESTERS

Cephalosporins have been found to demonstrate significant activity as antimicrobials. However, many of the cephalosporins are not well absorbed from the intestinal tract and must be administered by injection in order to achieve adequate concentrations of drug in the blood. In order to overcome the nonabsorption problem, the general approach is to attempt to synthesize antimicrobial cephalosporin analogues which are better absorbed from the intestinal tract. However, another approach avoids the tedious task of finding new active cephalosporins. This approach entails utilizing known antimicrobial cephalosporins that have a low order of intestinal absorption. These compounds are converted to structures which are readily absorbed from the intestinal tract and which upon entry in to the blood stream may be reconverted, such as by hydrolysis, into the known antimicrobial cephalosporins. Such an approach has been employed successfuly in the penicillin area (West German Pat. No. 2,112,057).

This invention relates to such compounds which are esters of cephalosporin having the formula:

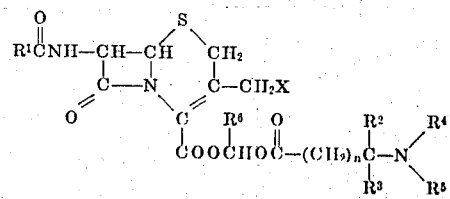

wherein $R^1$ is a group typical of a natural, synthetic, semisynthetic or biosynthetic cephalosporin, more specifically the

group is intended to represent acyl; $R^2$ is hydrogen, alkyl, aryl, substituted aryl wherein the substituent is halo, alkoxy, haloalkyl, alkyl, heterocyclic, aryloxy, aralkyl, etc. $R^3$, $R^4$ and $R^5$ are hydrogen, alkyl, aryl, aralkyl, substituted aralkyl wherein the substitutent is the same as above; X is hydrogen, hydroxy, alkanoyloxy, aroyloxy, azido, aralkanoyloxy, amino, alkylamino, dialkylamino, ammonium, alkoxy, alkylmercapto or heterocyclic mercapto such as 5-methyl-1,3,4-thiadiazol-2-ylmercapto; n is an integer from 0 to 5 and $R^2$ and $R^3$, $R^3$ and $R^4$ and $R^4$ and $R^5$ taken together may form ring systems of 5,6 or 7 members; and pharmaceutically acceptable salts thereof.

In addition, novel precursors used in their preparation, methods for preparing the above said compounds and their precursors, compositions employing said compounds and methods for administering said compositions as antimicrobials are also encompassed by the present invention.

Acyl ($R^1$ CO—) is defined in this invention as:

(a)

wherein $R^7$, $R^8$ and $R^9$ are hydrogen, alkyl, cycloalkyl, cycloalkenyl, cycloalkadienyl, alkoxyalkyl, alkoxyalkoxyalkyl, heterocyclyl, phenyl, substituted phenyl, phenoxy substituted phenoxy, amino, nitro, halogen, mercapto, alkylmercapto, alkylmercaptoalkyl, phenylthio and substituted phenylthio wherein the substituents on the heterocyclyl, phenyl, phenoxy, phenylthio may be one or more of the following: alkyl, alkoxy, halogen, nitro, amino and trifluoromethyl and $n$ is either 0 or an integer from 1 to 4.

b. $R^{10}CO$— wherein $R^{10}$ is hydrogen, amino, phenyl, substituted phenyl, alkoxy, thienyl, substituted thienyl, phenoxy, alkylthio, substituted phenoxy, β-alkenyl, β-alkylthioalkenyl, β-alkoxyalkenyl and β-alkenyloxyalkyl, wherein the substituents on the thienyl, phenyl and phenoxy may be one or more of the following: alkyl, alkoxy, halo, nitro, amino and trifluoromethyl.

However, in the above general formula, $R^1$ preferably is intended to include grouping such as benzyl, substituted benzyl (wherein the substituent may be alkyl, alkoxy, halogen, haloalkyl, etc.), α-substituted benzyl (wherein the α group is hydroxy, amino, ureido) 2-thienylmethyl, 3-thienylmethyl, α'-substituted-2-thienylmethyl, α-substituted-3-thienylmethyl (wherein the α' group is hydroxy, amino, ureido) 2-thienylmethyl, 3-thienylmethyl, cyanomethyl, tetrazolyl-1-methyl and azidoacetyl.

The term alkyl is intended to represent a group of 1 to 7 carbon atoms of a straight or branched chain configuration.

The term alkoxy is intended to represent a group of 1 to 7 carbon atoms of a straight or branched chain configuration linked to an oxygen atom.

The term alkylmercapto is intended to represent a group of 1 to 7 carbon atoms of a straight or branched chain configuration linked to a sulfur atom.

The term alkanoyl is intended to represent a group of 1 to 7 carbon atoms of a straight or branched chain configuration linked to a carbonyl group.

The term aryl is intended to include phenyl, 1-naphthyl and 2-naphthyl type groups.

The term heterocyclyl is intended to include furan, thiophene, tetrazole, pyrrole, imidazole, isothiazole, thiadiazole, pyridine, pyrimidine, benzimidazole, etc. and their hydrogenated derivatives.

In addition, the compounds of this invention are capable of existing in numerous stereoisomeric forms. It is intended that all the possible isomeric forms be encompassed by this invention.

The compounds of this invention may be prepared by numerous precedures. For example, a salt of a cephalosporin having the general formula:

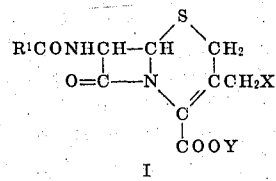

wherein $R^1$ and X are as previously described and Y is a cation, such as sodium, potassium, ammonium, trialkylammonium, etc., is reacted with a dihaloester of the formula:

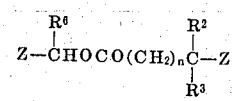

wherein $R^2$, $R^3$, $R^6$ and $n$ are as previously described and Z is a halogen, to form a compound of the formula:

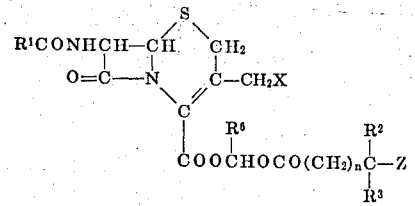

The reaction is generally carried out at from about 0° to about 50°C in a suitable inert organic solvent, such as dimethylformamide, dioxane, glycine, acetonitrile, chloroform, methylene chloride, nitromethane, benzene, toluene, etc.

These novel intermediates are then converted to the desired amine by reaction with ammonia, a primary amine, such as methylamine, ethylamine, benzylamine, etc., a secondary amine, such as dimethylamine, diethylamine, N-benzyl-N-ethylamine, etc. and heterocyclic amines, such as pyrrolidine, piperadine, morpholine, N-methylpiperazine, etc.

In place of a direct reaction with an amine, sodium azide may be employed to give a compound of the general formula:

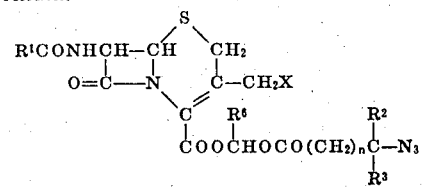

wherein $R^1$, $R^2$, $R^3$, $R^6$, X and $n$ are as previously described followed by catalytic reduction using a noble metal catalyst, such as platinum or palladium to give amines of the general formula:

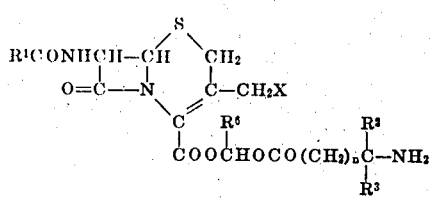

Another route for preparing the compounds of this invention utilizes a compound of the general formula:

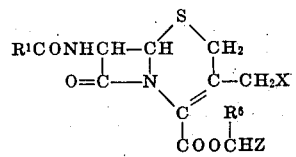

which is prepared by the reaction of chloroalkyl iodide, chloro aralkyliodide, such as chloromethyl iodide, 1-chloroethyl iodide, α-chlorobenzyl iodide, etc. and a compound of the type I. Compounds of this type are in turn reacted at from about 0° to about 50°C in an inert solvent with compounds of the general formula:

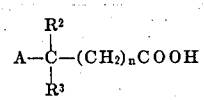

wherein A is a primary, secondary or tertiary amino group or a group which is readily converted to an amino group. Examples of groups which may be readily converted to amino groups are azide and nitro groups which may undergo reduction reactions to give primary amines or a halogen or sulfonate which may be displaced by an amino group; to give products designated by the general formula:

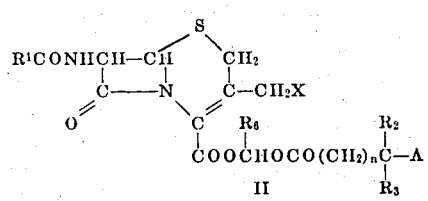

wherein $R^1$, $R^2$, $R^3$, $R^6$, X and $n$ are as previously described. Since A may represent an amino group in a protected form, such as N-t-butylcarbonyl and N-trityl, the final products may be obtained by hydrolytic or reductive removal of the protective group.

Another method for preparing compounds of the general formula II is to react a compound of the general formula I at from 0° to 50°C in an inert solvent, such as dimethyl formamide, with a compound of the general formula:

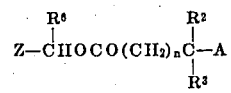

wherein $R^1$, $R^2$, $R^3$, $R^6$, X, A, n and Z are as previously described; however, Z is preferably a chlorine or bromine atom. The halo intermediate is readily prepared by the reaction of an acid chloride or an acid bromide of the general formula:

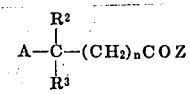

with an aldehyde of the general formula:

$$R^6-CHO$$

This method gives in addition to preparing the compounds wherein A is as previously defined, compounds wherein A may be defined as

wherein $R^4$ and $R^5$ are also as previously defined. Thus this method also permits the preparation of ring systems when $R^3$ and $R^4$ are taken together.

Also compounds of this invention may be prepared by acylation of a compound of the formula:

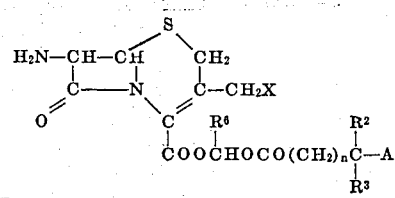

wherein $R^2$, $R^3$, $R^6$, X and $n$ are as previously described and salts thereof by a acylating agent derived from the acid $R^1COOH$, such as the acid halide, acid anhydride, a mixed acid anhydride (for example with a mono ester of carbonic acid, trimethylacetic acid or benzoic acid), acid azide, an active ester (for example cyanomethylester of p-nitrophenyl ester) or an active amide (for example acylimidazole). In addition, with the adding of certain reagents, the carboxylic acid may be used directly. The reagents to be employed are potent dehydrating agents (N,N'-dicyclohexylcarbodiimide), isoxazolium salts (N-ethyl-5-phenylisoxazolium-3'-sulfonate), ethyl 2-ethoxy-1,2-dihydroquinolinecarboxylate, etc.

One can also prepare compounds of general formula II by the methods shown for the preparation of compounds of the formula:

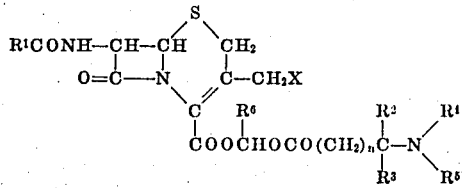

The compounds used in the above reactions are prepared by reacting a compound of the general formula:

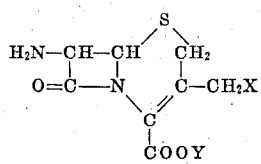

with a compound of the formula:

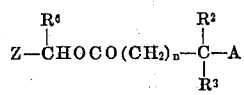

wherein $R^2$, $R^3$, $R^6$, X, Y, Z, A and n are as previously described and the reaction is carried out at from 0° to 50°C, preferably at room temperature in an inert solvent such as dimethylformamide.

Since this invention is directed to a means for aiding active cephalosporins to pass from the intestinal tract to the blood, the spectrum of activity and dosage is the same as that which has become generally established for cephalosporins in antimicrobial therapy. Examples of the type organisms that the compounds of the present invention are active against are β-hemolytic Streptococci, Staphylococci, Diplococcus pneumonia, *Escherichia coli, proteus mirabilis* and *Klebsiella sp.* The dosage range in animals such as dogs, cattle, etc. may vary from 5 mg/kg to 150 mg/kg of body weight per day preferably 15 mg/kg to 75 mg/kg of body weight per day. Thus the compounds of the present invention may be prepared in unit dosage forms of from 50 mg to 5 g, preferably 200 mg to 2 g.

The compounds of the present invention in the described dosages are intended to be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5 to about 75% or more of the weight of the unit. The amount of active compound in such therapeutically useful compositions or preparations is such that a suitable dosage unit form contains between about 10 and 200 mg of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Chloroacetoxymethyl 7-phenylacetaminocephalosporanate

To a cooled (5° to 10°) and stirred solution of chloromethyl chloroacetate (14.3 g) (prepared according to the method described in J. of Amer. Chem. Soc. 43 (1921) 660) in anhydrous dimethylformamide (200 ml), the finely pulverized potassium salt of 7-phenylacetylaminocephalosporanic acid is added (43 g) in portions over a 2 hour period, then one permits the reaction mixture to come to room temperature followed by stirring overnight. Ice water is next added and the resulting mixture is extracted 2 times with 100 ml portions of methylene chloride. The methylene chloride fraction is extracted 4 times with 100 ml portions of water, dried with magnesium sulfate, filtered and reduced to a small volume. Upon the addition of ether, the product came out of the solution as an oil. The oil is solidified by stirring it in the presence of ether.

EXAMPLES 2 – 4

By following the procedure of Example 1 and substituting an equivalent amount of the potassium salts of the following compounds:
potassium 7-(1,4-cyclohexadien-1-ylacetamido) cephalosporanate,
potassium 7-1,2,3,4-tetrazol-5-ylacetamidocephalosporante, and
potassium 7-phenylacetamido-desacetoxycephalosporante, the products obtained are:
chloroacetoxymethyl 7-(1,4-cyclohexadien-1-ylacetamido)- cephalosporanate,
chloroacetoxymethyl 7- 1,2,3,4-tetrazol-5-ylacetamidocephalosporanate, and
chloroacetoxymethyl 7-phenylacetamido-desacetoxycephalosporante.

EXAMPLES 5–10

By following the procedure of Example 1 and substituting an equivalent amount of the following chlorinated esters:
chloromethyl 2-chloropropionate,
chloromethyl α-chlorophenylacetate,
chloromethyl 2-chloro-3-phenylpropionate,
1-chloroethyl chloroacetate,
α-chlorobenzyl chloroacetate, and
1-chloroethyl 2-chloro-2,2-dimethylacetate the products obtained are:
2-chloropropionoxymethyl cephalosporanate,
α-chlorophenylacetoxymethyl cephalosporanate,
2-chloro-3-phenylpropionoxy cephalosporanate, 1-(chloroacetoxy)ethyl cephalosporanate,
α-(chloroacetoxy)benzyl cephalosporanate, and
2-chloro-2,2-dimethylacetoxy cephalosporanate.

EXAMPLE 11

Azidoacetoxymethyl
7-phenyl-acetaminocephalosphorante

To a solution of chloroacetoxymethyl 7-phenylacetaminocephalosporanate (5.07 g) in dimethylformamide (50 ml), one adds finely pulverized sodium azide (1.8 g) and stirs the reaction for 6 hours at room temperature. The reaction mixture is next diluted with ice water (300 ml) and the mixture is extracted 3 times with 50 ml portions of ethyl acetate. The combined ethyl acetate extracts are washed 4 times with 20 ml portions of water and evaporated to dryness giving the product in the form of a viscous residue. The product is solidified by stirring with ether. An infrared spectrum of the product shows azide absorption at 2180 cm$^{-1}$.

EXAMPLE 12

Aminoacetoxymethyl
7-phenylacetaminocephalosporanate

To a solution of azido-acetoxymethyl 7-phenylacetaminocephalosporanate (4 gm) in tetrahydrofuran (100 ml), one adds 10 per cent palladium on charcoal (4.0 g) suspended in water (60 ml). The mixture was stirred in a three-necked flask. The flask was initially flushed with nitrogen, then one introduces a uniform stream of hydrogen through the reaction mixture. During the addition a pH of 3 to 4 is maintained by the use of a glass electrode and dilute hydrochloric acid. When the pH remains constant, no more acid was added and the catalyst was filtered off. After removal of the tetrahydrofuran by use of a vacuum, the aqueous residue is washed twice with ethyl acetate, followed by the removal of the water by freeze drying leaving the product as an almost colorless porous powder.

EXAMPLES 13–16

By following the procedure of Example 12 and substituting an equivalent amount of the following esters:
 3-azido-3-carbomethoxypropionoxymethyl 7-cyanoacetamido cephalosporanate,
 α-(azido-acetoxy)benzyl 7-aminocephalosporanate,
 azidoacetoxymethyl 7-thien-2-ylacetaminodesacetoxycephalosporanate, and
 α-azido-α-phenylacetoxymethyl 7-(α-aminophenylacetamino) cephalosporanate
the products obtained are:
 3-amino-3-carboxyethoxypropionoxymethyl 7-cyanoacetoxycephalosporanate,
 α-(aminoacetoxy)benzyl 7-amino cephalosporanate,
 α-aminoacetoxymethyl 7-thien-2-ylacetaminodesacetoxycephalosporanate, and
 α-amino-α-phenylacetoxymethyl 7-(α-aminophenylacetamino)cephalosporanate.

EXAMPLE 17

N-t-Butoxycarbonyl-L,L-valine chloromethylester

To a stirring solution of chloroiodomethane (4.0 ml) in dimethylformamide (10 ml), a solution of t-butoxycarbonyl-D,L-valine (2.2 g) and triethylamine (2.0 ml) in dimethylformamide (10 ml) is added. After 3 hours, the reaction mixture is added to water and the aqueous phase separated and extracted with ethyl acetate. The combined organic portions are washed with water, aqueous sodium bicarbonate and water, respectively. The product is obtained after drying and removing the solvents under vacuum.

EXAMPLE 18

N-t-Butoxycarbonyl-D,L-valyloxymethyl
7-[thien-2-ylacetamido]cephalosporanate

A suspension of N-t-butylcarbonyl-D,L-valine chloromethyl ester (0.8 g), potassium 7-[thien-2-ylacetamido]cephalosporanate and potassium iodide (0.1 g) in dimethylformamide (15 ml) are stirred at room temperature for 10 days. The reaction mixture is next diluted with ethyl acetate, filtered, and the filtrate washed with aqueous sodium bicarbonate and water. After drying and removal of the solvents under vacuum the product is obtained.

EXAMPLE 19

D,L-Valyloxymethyl
7-[thien-2-ylacetamido]cephalosporanate

To a solution of N-t-butoxy-D,L-valyloxymethyl 7-thien-2-ylacetamidocephalosporanate (5 g) in dioxane (5 ml), water (2.5 ml) was added. While stirring the pH was lowered to 2 by the addition of 0.2N HCl. After stirring for 1 hour, water (15 ml) is added followed by extraction with two 5 ml portions of ethyl acetate. The aqueous phase is freeze dried to give the product.

EXAMPLE 20

Chloromethyl
7-[thien-2-yl(ureido)acetamido]cephalosporanate

To a solution of 7-thien-2-yl(ureido)acetamidocephalosporanate acid (75 g) and triethylamine (30 ml) in dimethylformamide (250 ml), chloroiodomethane is added and the reaction mixture is stirred for 4 hours at room temperature, followed by dilution with ethyl acetate (500 ml) and ether (500 ml). After filtration, the filtrate is washed 3 times with 250 ml portions of water, 150 ml of 0.5 molar sodium bicarbonate, and then two 100 portions of water. The solvent is removed from the organic phase after drying under vacuum to give the product.

EXAMPLE 21

Glycyloxymethyl 7-thien-2-yl(ureido)
acetamidocephalosporanate

Potassium N-(1-methyl-2-carbethoxyvinyl)glycinate hemihydrate (3.5 g) is added to a solution of crude chloromethyl 7-thien-2-yl(ureido)acetamidocephalosporanate (5.0 g) in dimethylformamide (75 ml) and is stirred for about 20 hours at room temperature. The resulting solution is diluted with ethyl acetate (300 ml) and washed with three 75 ml portions of water, 40 ml 0.5 molar sodium bicarbonate and twice with 40 ml portions of water. Upon drying and removing the solvent under vacuum one obtains the crude N-(1-methyl-2-carbethoxyvinyl)-glycyloxymethyl 7-thien-2-yl(ureido)acetamidocephalosporanate. This material is dissolved in tetrahydrofuran (50 ml) followed by the addition of water (50 ml) and the pH adjusted to about 2.5 by the addition of 2N hydrochloric acid to the stirring solution. As the hydrochloric acid is consumed during hydrolysis, more is added by an automatic titrator. Upon completion of hydrochloric acid consumption, the tetrahydrofuran is removed under reduced pressure at 35°C and the remaining aqueous phase is extracted with ethyl acetate (15 ml) twice. To the ethyl acetate phase, ether (30 ml) and water (50 ml) is added and the pH of the aqueous phase is adjusted to 2.5 by the addition of dilute hydrochloric acid while stirring, next the aqueous phase is separated and the combined aqueous phases are washed with ether, filtered and freeze dried to yield the product.

EXAMPLES 22–24

By following the procedure of Example 21 and substituting an equivalent amount of the following reactants:
Potassium 3-(α-carbomethoxyacetoneimino)-3-carbomethoxypropionate and chloromethyl 7-cyanoacetamidocephalosporanate,
Potassium 3-N-phenyl-N-ethylaminobutyrate and 1-chloroethyl 7-phenylacetamidocephalosporanate, and
Potassium 3-N,N-dimethylamino-2-methyl-butyrate and 1-chlorobenzyl 7-acetamidocephalosporanate, the products obtained are:
3-(α-carbomethoxyacetoneimino)-3-carbomethoxypropionoxymethyl 7-cyanoacetamido,
1-(3-N-phenyl-N-ethylaminobutyroxy)ethyl 7-phenylacetamidocephalosporanate, and
1-(3-N,N-dimethylamino-2-methylbutyroxy)benzyl 7-acetamidocephalosporanate.

EXAMPLE 25

Chloromethyl N,N-dimethylaminoacetate

To a stirring solution of N,N-dimethylaminoacetic acid (25 g) and triethylamine (14 ml) in dimethylformamide (60 ml), a solution of chloriodomethane (24 ml) in dimethylformamide (40 ml) is added in a dropwise manner. After stirring for 4 hours at room temperature, the reaction mixture is poured in water (400 ml), the organic phase is separated and the aqueous phase is extracted with ethyl acetate. After the organic phase is washed with water and twice with aqueous sodium bicarbonate solution and lastly again with water, the organic phase is dried and the solvent removed under vacuum leaving the product as the residue.

EXAMPLE 26

Dimethylaminoacetoxymethyl 7-cyanoacetamidocephalosporanate

To a solution of chloromethyl N,N-dimethylaminoacetate (7 g) in dimethylformamide (90 ml), potassium 7-cyanoacetamidocephalosporanate (8 g) and potassium iodide (0.1 g) are added, and the resulting suspension is stirred for 7 days. Next the mixture is diluted with ethyl acetate, filtered and the filtrate is washed with aqueous sodium bicarbonate followed by water. The organic phase is dried, the volatile components removed under vacuum leaving the product as the residue.

EXAMPLES 27–29

By following the procedure of Example 26 and substituting equivalent amounts of the following reactants:
chloromethyl 2-(N,N-dimethylamino)-2,2-pentamethyleneacetate,
1-chloroethyl 2-(piperidin-1-yl)acetate, and
1-chlorobutyl N-methyl-piperidine-2-carboxylate
the products obtained are:
2-(N,N-dimethylamino)-2,2-pentamethylenecarboxymethyl 7-cyanoacetamidocephalosporanate,
1-[(2-piperidin-1-yl)acetoxy]ethyl 7-cyanoacetamidocephalosporanate, and
1-(N-methylpiperidine-2-carboxy)butyl 7-cyanoacetamidocephalosporanate.

Example 30

Preparation of capsule formulation

| Ingredient | Milligrams per Capsule |
|---|---|
| Dimethylaminoacetoxymethyl 7-phenylacetamidocephalosporanate | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

Example 31

Preparation of tablet formulation

| Ingredient | Milligrams per Capsule |
|---|---|
| Aminoacetoxymethyl 7-phenylacetamidodesacetoxycephalosporinate | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 ml of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 ml of active ingredient.

Example 32

Preparation of oral syrup formulation

| Ingredient | Amount |
|---|---|
| Diethylaminoacetoxymethyl 7-thien-2-ylacetamidocephalosporanate | 5000 mg |
| Sorbitol solution (70% N.F.) | 40 ml |
| Sodium benzoate | 150 mg |
| Sucaryl | 90 mg |
| Saccharin | 10 mg |
| Red Dye (F.D. & C. No. 2) | 10 mg |
| Cherry flavor | 50 mg |
| Distilled water qs to | 100 ml |

The sorbitol solution is added to 40 ml of distilled water and the active ingredient is suspended therein. The sucaryl, saccharin, sodium benzoate, flavor and dye are added and dissolved in the above solution. The volume is adjusted to 100 ml with distilled water.

Other ingredients may replace those listed in the above formulation. For example, a suspending agent such as bentonite magma, tragacanth, carboxymethyl-

What is claimed is:

1. A compound of the formula

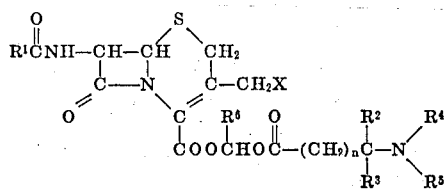

wherein $R^1$ is thienylmethyl, α-ureidothienylmethyl, or furylmethyl; $R^2$ and $R^6$ each is hydrogen, lower alkyl or phenyl-lower alkyl; $R^3$, $R^4$ and $R^5$ each is hydrogen or lower alkyl; X is hydrogen, hydroxy or lower alkanoyloxy; and $n$ is 0 to 5.

2. The compound of claim 1, diethylaminoacetoxymethyl 7-thien-2-ylacetamidocephalosporanate.

3. The compounds of claim 1 wherein $R^1$ is 2-thienylmethyl.

4. The compounds of claim 1 wherein $R^1$ is 2-furylmethyl.

5. The compound of claim 1 D,L-valyloxymethyl 7-[thien-2-ylacetamido]cephalosporanate.

6. The compound of claim 1, glycyloxymethyl 7-thien-2-yl(ureido)acetamidocephalosporanate.

* * * * *